(12) United States Patent
Yu et al.

(10) Patent No.: US 11,977,602 B2
(45) Date of Patent: May 7, 2024

(54) DOMAIN GENERALIZED MARGIN VIA META-LEARNING FOR DEEP FACE RECOGNITION

(71) Applicant: NEC Laboratories America, Inc., Princeton, NJ (US)

(72) Inventors: Xiang Yu, Mountain View, CA (US); Yi-Hsuan Tsai, Santa Clara, CA (US); Masoud Faraki, San Jose, CA (US); Ramin Moslemi, Pleasanton, CA (US); Manmohan Chandraker, Santa Clara, CA (US); Chang Liu, Medford, MA (US)

(73) Assignee: NEC Corporation, Tokyo (JP)

( * ) Notice: Subject to any disclaimer, the term of this patent is extended or adjusted under 35 U.S.C. 154(b) by 375 days.

(21) Appl. No.: 17/521,252

(22) Filed: Nov. 8, 2021

(65) Prior Publication Data

US 2022/0147767 A1 May 12, 2022

Related U.S. Application Data (60) Provisional application No. 63/114,014, filed on Nov. 16, 2020, provisional application No. 63/111,658, filed on Nov. 10, 2020.

(51) Int. Cl.
*G06K 9/00* (2022.01)
*G06F 18/21* (2023.01)
(Continued)

(52) U.S. Cl.
CPC .......... *G06F 18/214* (2023.01); *G06F 18/217* (2023.01); *G06N 20/00* (2019.01); *G06V 40/172* (2022.01)

(58) Field of Classification Search
CPC ..... G06F 18/214; G06F 18/217; G06N 20/00; G06N 3/08; G06V 40/172; G06V 10/82
See application file for complete search history.

(56) References Cited

U.S. PATENT DOCUMENTS

2021/0374547 A1* 12/2021 Wang .................. G06N 3/047

FOREIGN PATENT DOCUMENTS

| CN | 109886337 A | * | 6/2019 | |
| CN | 111582199 B | * | 5/2023 | ......... G06K 9/00288 |

(Continued)

OTHER PUBLICATIONS

Jamal, Muhammad Abdullah, et al. "Rethinking class-balanced methods for long-tailed visual recognition from a domain adaptation perspective", InProceedings of the IEEE/CVF Conference on Computer Vision and Pattern Recognition. Jun. 2020, pp. 7610-7619.

(Continued)

*Primary Examiner* — Xin Jia
(74) *Attorney, Agent, or Firm* — Joseph Kolodka (57) ABSTRACT

A method for training a model for face recognition is provided. The method forward trains a training batch of samples to form a face recognition model w(t), and calculates sample weights for the batch. The method obtains a training batch gradient with respect to model weights thereof and updates, using the gradient, the model w(t) to a face recognition model what(t). The method forwards a validation batch of samples to the face recognition model what(t). The method obtains a validation batch gradient, and updates, using the validation batch gradient and what(t), a sample-level importance weight of samples in the training batch to obtain an updated sample-level importance weight. The method obtains a training batch upgraded gradient based on the updated sample-level importance weight of the training batch samples, and updates, using the upgraded gradient, the (Continued)

model w(t) to a trained model w(t+1) corresponding to a next iteration.

20 Claims, 6 Drawing Sheets

(51) Int. Cl.
  *G06F 18/214* (2023.01)
  *G06N 20/00* (2019.01)
  *G06V 40/16* (2022.01)

(56) References Cited

FOREIGN PATENT DOCUMENTS

| WO | WO-2019090954 A1 * | 5/2019 | ............. G06N 20/00 |
| WO | WO-2021057926 A1 * | 4/2021 | ............. G06F 7/483 |

OTHER PUBLICATIONS

Ren, Mengye, et al. "Learning to reweight examples for robust deep learning", InInternational Conference on Machine Learning. Jul. 3, 2018, pp. 4334-4343.

* cited by examiner

Algorithm 1: Meta-learning for Face recognition
Require: Training set $T$ balanced development set $D$
Require: Class-wise weights $\{w_y\}$ estimated by using [?]
Require: Learning rates $n$ and $\tau$, stopping steps $t_1$ and $t_2$
Require: Initial parameters $\theta$ of the recognition network 1. for $t = 1, 2, \cdots, t_1$ do
2.     Sample a mini-batch $B$ from the training set $T$
3.     Compute loss $L_B = \frac{1}{|B|}\Sigma_{i \in B} L(f(x_i; \theta), y_i)$
4.     Update $\theta \leftarrow \theta - n\nabla_\theta L_B$
5. end for
6. for $t = t_1 + 1, \cdots, t_1 + t_2$ do
7.     Sample a mini-batch $B$ from the training set $T$
8.     Set $\epsilon_i \leftarrow 0, \forall i \in B$, and denote by $\epsilon := \{\epsilon_i, i \in B\}$
9.     Compute $L_B = \frac{1}{|B|}\Sigma_{i \in B}(w_{y_i} + \epsilon_i) L(f(x_i; \theta), y_i)$
10.     Update $\tilde{\theta}_{(\epsilon)} \leftarrow \theta - n\nabla_\theta L_B$
11.     Sample $B_d$ from the balanced development set $D$
12.     Compute $L_{B_d} = \frac{1}{|B_d|}\Sigma_{i \in B_d} L(f(x_i; \tilde{\theta}(\epsilon)), y_i)$
13.     Update $\epsilon \leftarrow \epsilon - \tau \nabla_\epsilon L_{B_d}$
14.     Compute new loss with the updated $\epsilon$
        $\tilde{L}_B = \frac{1}{|B|}\Sigma_{i \in B}(w_{y_i} + \epsilon_i) L(f(x_i; \theta), y_i)$
15.     Update $\theta \leftarrow \theta - n\nabla_\theta \tilde{L}_B$
16. end for

FIG. 4

Algorithm 2 Instance-level margin meta-learning

Require: Training set $T$, validation set $V$

Require: Class-wise margin $\{m_y^{cls}\}$

Require: Learning rates $n$ and $\tau$, stopping steps $t_1$ and $t_2$

1. for $t = 1, 2, \cdots, t_1$ do
2.     Sample a mini-batch $B$ from the training set $T$
3.     Compute loss $L_B$ with Eqn. 1
4.     Update $\Omega \leftarrow \Omega - n\nabla_\Omega L_B$
5. end for
6. for $t = t_1 + 1, \cdots, t_1 + t_2$ do
7.     Sample a mini-batch $B$ from the training set $T$
8.     Set $r_j^k \leftarrow 0, \forall j \in B$, denote by $r^k := \{r_j^k, j \in B\}$
9.     Set $m \leftarrow \sum_k r^k + m_y^{cls}$
10.    Compute $L_B = \frac{1}{|B|}\sum_{i \in B} L_{ce}(f(x_i; \Omega, m), y_i)$
11.    Update $\tilde{\Omega}(m) \leftarrow \Omega - n\nabla_\Omega L_B$ with Eqn. 10
12.    for $k = 1:4$ do (4 factors of variations)
13.       Sample $B_v$ from $V$ with Eqn. 9.
14.       Compute $L_{B_v}$ using Eqn. 11 with $\tilde{\Omega}(m)$
15.       Update $r^k \leftarrow r^k - \tau \nabla_{r^k} L_{B_v}$
16.    end for
17.    Set $m \leftarrow \sum_k r^k + m_y^{cls}$
18.    Compute $\tilde{L}_B$ with the updated $m$ using Eqn. 12
19.    Update $\Omega \leftarrow \Omega - n\nabla_\theta \tilde{L}_B$
20. end for

DOMAIN GENERALIZED MARGIN VIA META-LEARNING FOR DEEP FACE RECOGNITION

RELATED APPLICATION INFORMATION

This application claims priority to U.S. Provisional Patent Application No. 63/111,658, filed on Nov. 10, 2020, and U.S. Provisional Patent Application No. 63/114,014, filed on Nov. 16, 2020, incorporated herein by reference in their entireties.

BACKGROUND

Technical Field

The present invention relates to face recognition and more particularly to a domain generalized margin via meta-learning for deep face recognition.

Description of the Related Art

Deep face recognition has achieved remarkable progress with several methods achieving strong results on public benchmarks. However, training data distributions continue to be biased, whereby a method trained with uniform sampling of the data might lead to undesirable effects such as lower accuracy along certain factors (say, occlusions), or a perception of model unfairness (say, against minority ethnicities).

Since it is impractical to collect training data that sufficiently covers a wide variety of variations, there is pressing need to develop training methods that algorithmically mitigate dataset bias along multiple factors of variation.

SUMMARY

According to aspects of the present invention, a computer-implemented method for training a model for deep face recognition is provided. The method includes performing forward training on a training batch of samples to form a face recognition model $w(t)$. The method further includes calculating sample weights for the training batch based on a meta-learner. The method also includes obtaining, by a processor device, a gradient of the training batch with respect to model weights of the training batch and updating, using the gradient of the training batch, the face recognition model $w(t)$ to a face recognition model $w_{hat}(t)$. The method also includes forwarding a validation batch of samples to the face recognition model $w_{hat}(t)$. The method additionally includes obtaining, by the processor device, a gradient of the validation batch with respect to a meta-learner theta(t), and updating, using the gradient of the validation batch and the face recognition model $w_{hat}(t)$, a sample-level importance weight of samples in the training batch to obtain an updated sample-level importance weight of the samples in the training batch. The method further includes obtaining, by the processor device, an upgraded gradient of the training batch based on the updated sample-level importance weight of the samples in the training batch, and updating, using the upgraded gradient of the training batch, the face recognition model $w(t)$ to a trained model $w(t+1)$ corresponding to a next iteration.

According to other aspects of the present invention, a computer program product for training a model for deep face recognition is provided. The computer program product includes a non-transitory computer readable storage medium having program instructions embodied therewith. The program instructions are executable by a computer to cause the computer to perform a method. The method includes performing, by a processor device of the computer, forward training on a training batch of samples to form a face recognition model $w(t)$. The method further includes calculating, by the processor device, sample weights for the training batch based on a meta-learner. The method also includes obtaining, by the processor device, a gradient of the training batch with respect to model weights of the training batch and updating, using the gradient of the training batch, the face recognition model $w(t)$ to a face recognition model $w_{hat}(t)$. The method additionally includes forwarding, by the processor device, a validation batch of samples to the face recognition model $w_{hat}(t)$. The method further includes obtaining, by the processor device, a gradient of the validation batch with respect to a meta-learner theta(t), and updating, using the gradient of the validation batch and the face recognition model $w_{hat}(t)$, a sample-level importance weight of samples in the training batch to obtain an updated sample-level importance weight of the samples in the training batch. The method also includes obtaining, by the processor device, an upgraded gradient of the training batch based on the updated sample-level importance weight of the samples in the training batch, and updating, using the upgraded gradient of the training batch, the face recognition model $w(t)$ to a trained model $w(t+1)$ corresponding to a next iteration.

According to yet other aspects of the present invention, a computer processing system for training a model for deep face recognition is provided. The computer processing system includes a memory device for storing program code. The computer processing system further includes a processor device operatively coupled to the memory device for running the program code to perform forward training on a training batch of samples to form a face recognition model $w(t)$. The processor device further runs the program code to calculate sample weights for the training batch based on a meta-learner. The processor device also runs the program code to obtain a gradient of the training batch with respect to model weights of the training batch and updating, using the gradient of the training batch, the face recognition model $w(t)$ to a face recognition model $w_{hat}(t)$. The processor device additionally runs the program code to forwarding a validation batch of samples to the face recognition model $w_{hat}(t)$. The processor device further runs the program code to obtain a gradient of the validation batch with respect to a meta-learner theta(t), and updating, using the gradient of the validation batch and the face recognition model $w_{hat}(t)$, a sample-level importance weight of samples in the training batch to obtain an updated sample-level importance weight of the samples in the training batch. The processor device also runs the program code to obtain an upgraded gradient of the training batch based on the updated sample-level importance weight of the samples in the training batch, and updating, using the upgraded gradient of the training batch, the face recognition model $w(t)$ to a trained model $w(t+1)$ corresponding to a next iteration.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to a domain generalized margin via meta-learning for deep face recognition. The terms "margin" and various forms of the same and "sample-level importance" are used interchangeably herein. The terms "instances" and "samples" are also used interchangeably herein.

Embodiments of the present invention provide a training method to simultaneously overcome multiple factors of data imbalance, such as volume, ethnicity, occlusion and head pose, in a unified framework. This represents an advance over prior works that use class re-weighting strategies and only handle volume imbalances.

In embodiments of the present invention, an instance-level variation-aware loss (ILVA) is provided that formulates each long-tailed factor of variation into an importance modeling. Next, an additive model of the importance prior with its residual is proposed, where the residual is learned through meta learning under a held-out meta training set. Finally, multiple learned importances are combined to re-balance the training data distribution across several factors of variation.

Figure 1:
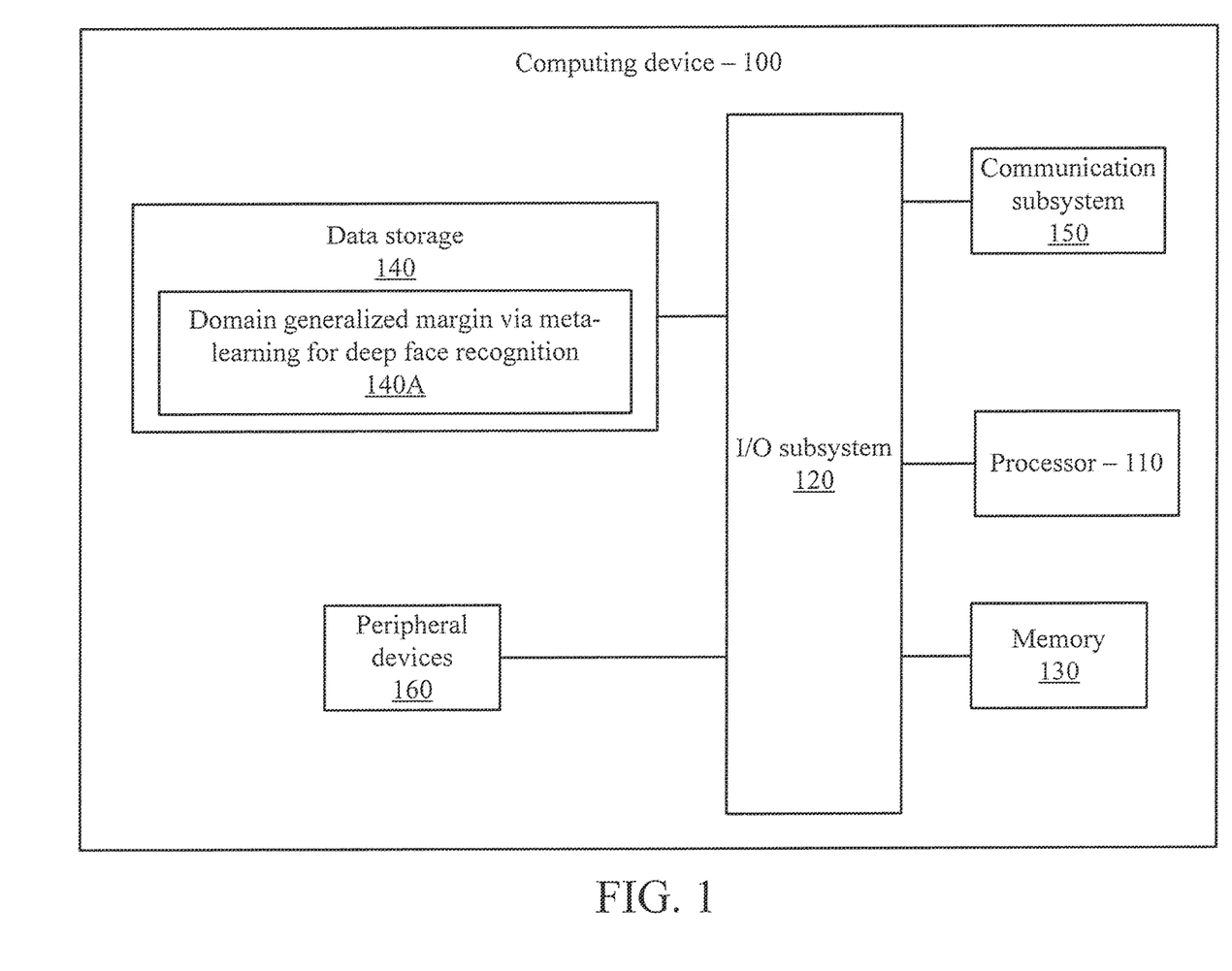
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to provide a domain generalized margin via meta-learning for deep face recognition.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for providing a domain generalized margin via meta-learning for deep face recognition. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
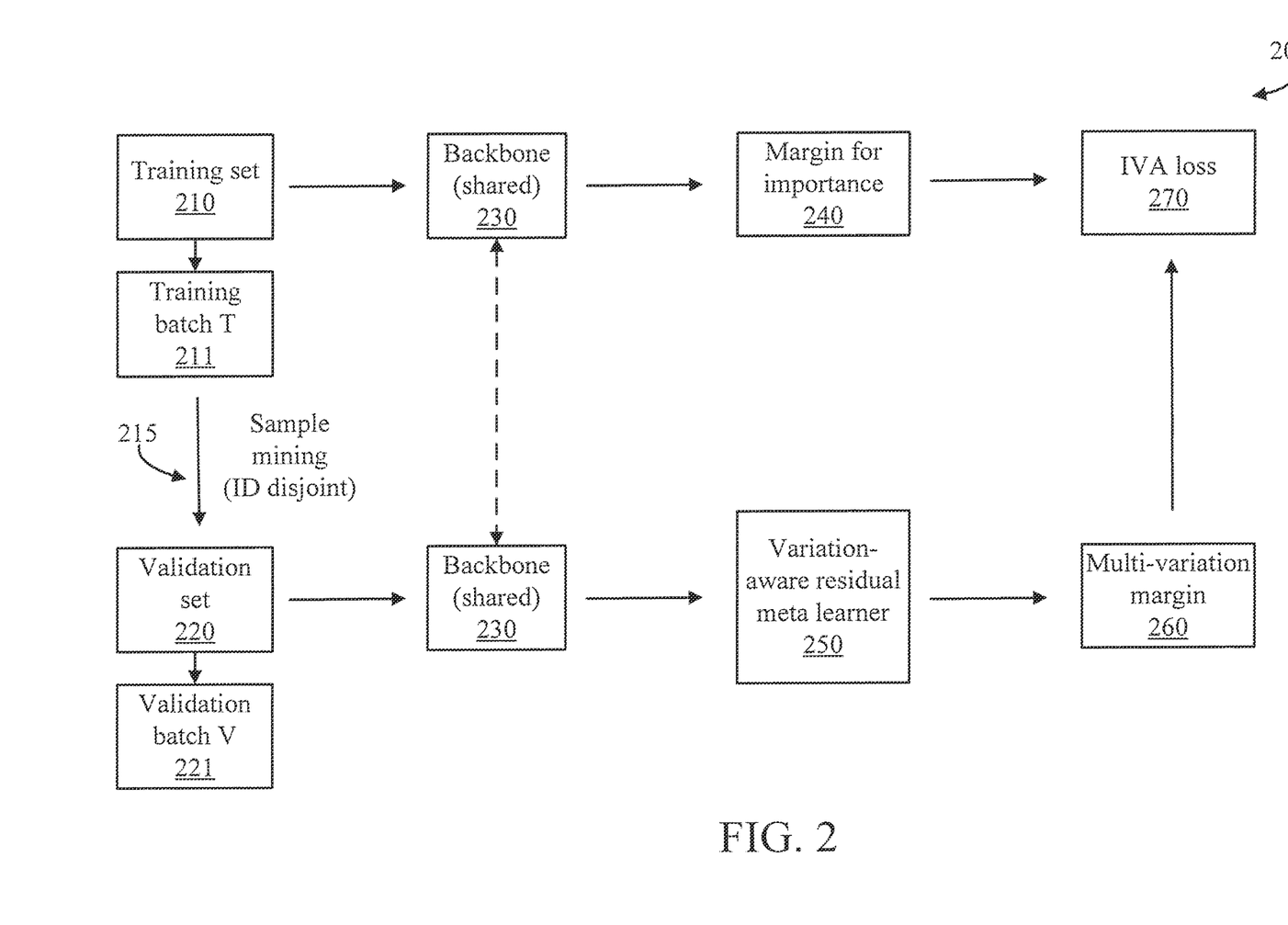
FIG. 2 is a block diagram showing an exemplary framework 200, in accordance with an embodiment of the present invention.

These and other variations of a hardware processor subsystem are also contemplated in accordance with embodiments of the present invention FIG. 2 is a block diagram showing an exemplary framework 200, in accordance with an embodiment of the present invention. The framework includes a training set 210 having a training batch T 211, a sample mining process 215, a validation set 220, a validation batch V 221, a shared backbone 230, a margin for importance 240, a meta-learner 250, a multi-variation margin 260, and an IVLA loss 270. These elements are described in further detail herein below.

Figure 3:
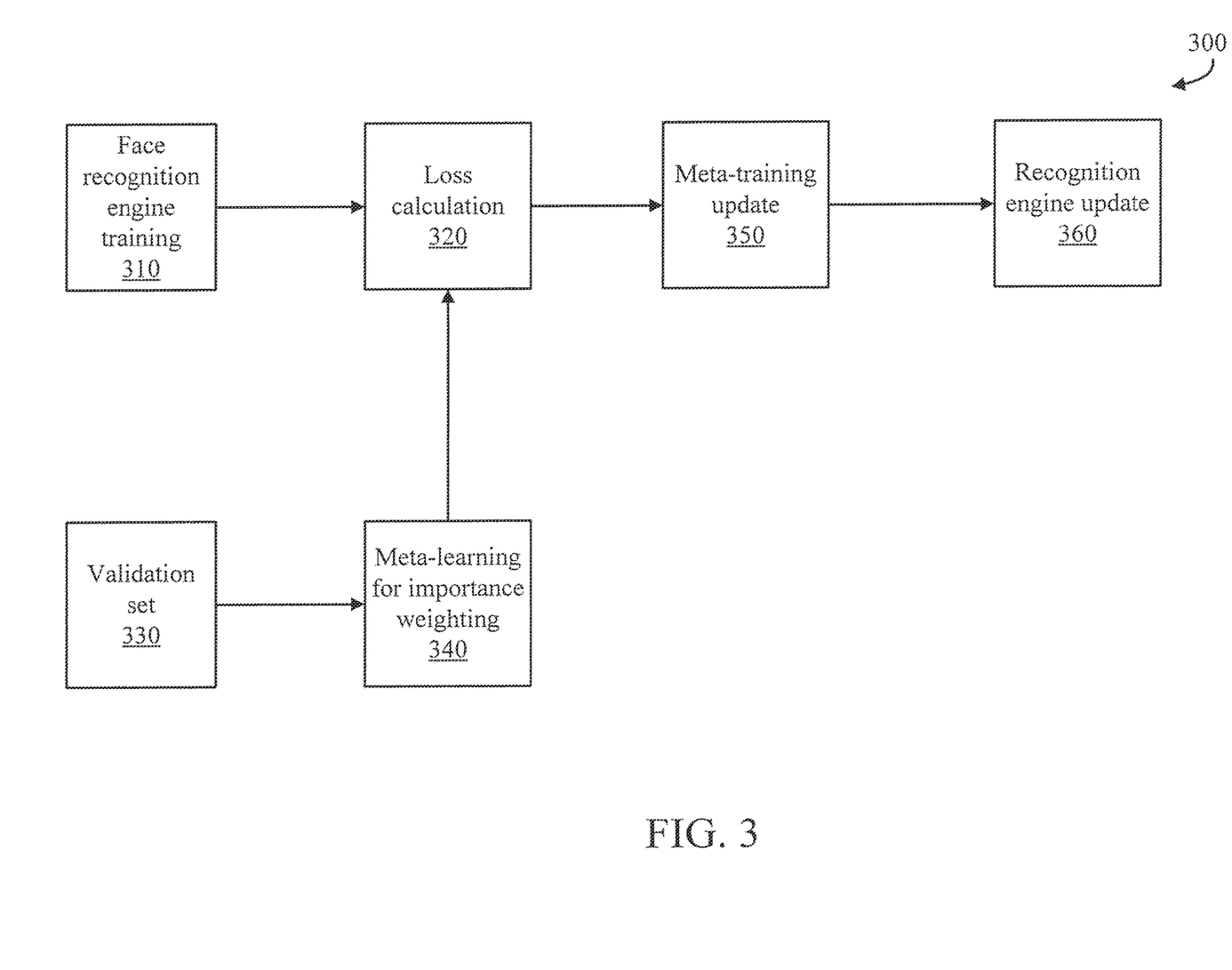
FIG. 3 is a high-level block diagram showing a deep face recognition system/method 300, in accordance with an embodiment of the present invention.

FIG. 3 is a high-level block diagram showing a deep face recognition system/method 300, in accordance with an embodiment of the present invention.

The system/method 300 includes a face recognition engine training block 310, a loss calculation block 320, a validation set 330, a meta-learning for importance weighting block 340, a meta-training update block 350, and a recognition engine update block 360.

The recognition engine training block 310 uses a ResNet-101 based backbone, receiving the cropped face images with size 100×100×3 as the input.

The loss calculation block 320 takes the output, a feature vector from the recognition engine block as the input and processes the feature into an identity related logit, and penalizes it against the ground truth identity label for the loss.

The validation set 330 is independently selected to conduct the meta-learning stage.

The meta-learning for importance weighting 340 is a model-agnostic meta learning framework, by penalizing the variation loss to select the samples from the validation set 330 that have the maximum complementary distribution information from the current training set batch, hence, to enrich the training distribution to be more balanced.

The a meta-training update block 350 uses the newly feedback validation data to update the importance weight for the current training batch.

The recognition engine update block 360: Based on the updated new importance weight, we conduct the loss calculation 320 again to update the recognition engine weights as to finish this typical update iteration.

Herein, three exemplary augmentable variations are introduced, namely blur, occlusion and head pose, to augment the training data. Of course, other variations can also be used, while maintaining the spirit of the present invention.

Hereinafter, a confidence-aware identification loss is introduced to learn from hard examples, which is further extended thereafter by splitting the feature vectors into sub-embeddings with independent confidence. Later, the introduced augmentable variations are applied to further decorrelate the feature embeddings. A non-augmentable variation discovery is proposed to explore more variations for better decorrelation. Finally, an uncertainty guided pairwise metric is proposed for inference.

Self-Supervised Multi-task Learning.

Variable definitions are as follows:

x: the input face images
y: the ground truth identity label
θ: the recognition engine model parameters
w: the recognition classifier parameter
v: indicating the specific domain (variation)
$f_i$: the feature (output of 310) vector
$s_i$: the scaling factor for $L_{idt}$ loss (Eqn (2))
m: the $L_{idt}$ loss margin
(1) Benefit the Hard Example Learning; Help Optimization $$L_{MT}(x, y; \theta, w, v) = L_{idt}(x, y; \theta, w) + \sum_{t=1}^{T} L_{domain}^{t}(x, y; \theta, v_t) \quad (1)$$

$$L_{idt}(x, y; \theta, w) = -\log \frac{\exp(s_i w_{y_i}^T f_i - m)}{\exp(s_i w_{y_i}^T f_i - m) + \Sigma_{j \neq y_i} \exp(s_i w_{y_i}^T f_i)} \quad (2)$$

$$L_{domain} = -\log \frac{\exp(w_{y_i}^T f_i)}{\Sigma_{j=y_i} \exp(w_j^T f_i)}, \quad (3)$$

Domain Balancing Via Meta-Learning $$\theta^{t+1}(\epsilon^t) \leftarrow \theta^t - n \frac{\partial \Sigma_{i \in T} L(f(x_i; \theta^t), y_i; m_{yi} + \epsilon_i^t)}{\partial \theta}$$

$$\epsilon^{t+1} \leftarrow \epsilon^t - \tau \frac{\partial \Sigma_{i \in D} L(f(x_i; \theta^{t+1}(\epsilon^t)), y_i)}{\partial \epsilon}$$

$$\theta^{t+1} \leftarrow \theta^t - n \frac{\partial \Sigma_{i \in T} L(f(x_i; \theta^t), y_i; m_{yi} + \epsilon_i^{t+1}))}{\partial \theta}$$

Class Balancing as Domain Adaptation

Suppose there is a training set (source domain) $\{(x_i, y_i)\}_{i=1}^{n}$ drawn i.i.d. from a long-tailed distribution $P_s(x, y)$—more precisely, the marginal distribution $P_s(y)$ of classes are heavy-tailed because, in visual recognition, it is often difficult to collect examples for rare classes. Nonetheless, it is expected to learn a visual recognition model to make as few mistakes as possible on all classes:

$$\text{error} = \mathbb{E}_{P_t(x,y)} L(f(x;\theta),y), \quad (4)$$

where it is desired a target domain $P_t(x, y)$ whose marginal class distribution $P_t(y)$ is more balanced (e.g., a uniform distribution) at the inference time, $f(.; \theta)$ is the recognition model parameterized by $\theta$, and $L(\bullet,\bullet)$ is a 0-1 loss. The notation $L(\bullet,\bullet)$ is loosened a little and let be a differentiable surrogate loss (i.e., cross-entropy) during training.

Next, an importance sampling trick is applied to connect the expected error with the long-tailed source domain, as follows:

$$\text{error} = \mathbb{E}_{P_t(x,y)} L(f(x;\theta), y) \quad (5)$$

$$= \mathbb{E}_{P_s(x,y)} L(f(x;\theta), y) P_t(x, y)/P_s(x, y) \quad (6)$$

$$= \mathbb{E}_{P_s(x,y)} L(f(x;\theta), y) \frac{P_t(y) P_t(x|y)}{P_s(y) P_s(x|y)} \quad (7)$$

$$:= \mathbb{E}_{P_s(x,y)} L(f(x;\theta), y) w_y (1 + \tilde{\epsilon}_{x,y}), \quad (8)$$

where $w_y = P_t(Y)/P_s(y)$ and $\tilde{\epsilon}_{x,y} = P_t(x, y)/P_s(x|y) - 1$.

Existing class-balanced methods focus on how to determine the class-wise weights $\{w_y\}$ and result in the following objective function for training, $$\min_\theta \frac{1}{n} \sum_{i=1}^{n} w_{y_i} L(f(x_i;\theta), y_i), \quad (9)$$

which approximates the expected inference error (Equation (8)) by assuming $\tilde{\epsilon}_{x,y} = 0$ or, in other words, by assuming $P_s(x|y) = P_t(x|y)$ for any class y. This assumption is referred to as target shift in domain adaptation.

It is contended that the assumption of a shared conditional distribution, $P_s(x|y) = P_t(x|y)$, does not hold in general, especially for the tail classes. One may easily compile a representative training set for Dog, but not for King Eider. The present invention proposes to explicitly model the difference $\tilde{\epsilon}_{x,y}$ between the source and target conditional distributions and arrive at an improved algorithm upon the class-balanced methods.

Modeling the Conditional Differences

For simplicity, a conditional weight $\epsilon_{x,y} := w_y \tilde{\epsilon}_{x,y}$ is introduced and the expected inference error as rewritten as:

$$\text{error} = \mathbb{E}_{P_s(x,y)} L(f(x;\theta), y)(w_y + \epsilon_{x,y}) \quad (10)$$

$$\approx \frac{1}{N} \sum_{i=1}^{n} (w_{y_i} + \epsilon_i) L(f(x_i;\theta), y_i), \quad (11)$$

where the last term is an unbiased estimation of the error. Notably, the present invention does not make the assumption that the conditional distributions of the source and target domains are the same, i.e., it is allowed $P_s(x|y) \neq P_t(x|y)$ and $\epsilon_i \neq 0$. Hence, the weight for each training example consists of two parts. One component is the class-wise weight $w_{y_i}$, and the other is the conditional weight $\epsilon_i$. The present invention needs to estimate both components to derive a practical algorithm from Equation (11) because the underlying distributions of data are unknown, although it is believed the class distribution of the training set must be long-tailed.

Estimating the Class-Wise Weights $\{w_y\}$

The present invention lets the class-wise weights resemble the empirically successful design in the literature. In particular, the present invention estimates class-wise weights by the recently proposed "effective numbers". Supposing there are $n_y$ training examples for the y-th class, then $w_y \approx (1-\beta)/(1-\beta^{n_y})$ where $\beta \in [0,1)$ is a hyperparameter with the recommended value $\beta = (n-1)/n$, and n is the number of training examples.

Meta-Learning of the Conditional Weights $\{\epsilon_i\}$

The conditional weights are estimated by customizing a meta-learning framework.

The main idea is to hold out a balanced development set D from the training set and use it to guide the search for the conditional weights that give rise to the best-performing recognition model $f(\bullet; \theta)$ on the development set. Denote by T the remaining training data. The present invention seeks the conditional weights $\epsilon := \{\epsilon_i\}$ by solving the following problem, $$\min_\epsilon \frac{1}{|D|} \sum_{i \in D} L(f(x_i; \theta^*(\epsilon)), y_i) \text{ with} \quad (12)$$

$$\theta^*(\epsilon) \leftarrow \operatorname*{argmin}_\theta \frac{1}{|T|} \sum_{i \in T} (w_{y_i} + \epsilon_i) L(f(x_i;\theta), y_i) \quad (13)$$

where the present invention does not weigh the losses over the development set which is already balanced. Essentially, the problem above searches for the optimal conditional weights such that, after the present invention learns a recognition model $f(\bullet; \theta)$ by minimizing the error estimation (Equations (13) and (11)), the model performs the best on the development set (Equation (12)).

It would be daunting to solve the problem above by brute force search, e.g., iterating all the possible sets $\{\epsilon\}$ of conditional weights. Even if it can, it is computationally prohibitive to train for each set of weights a recognition model $f(\bullet; \theta^*(\epsilon))$ and then find out the best model from all.

Instead, the present invention modifies the meta-learning framework and searches for the conditional weights in a greedy manner. The present invention interleaves the quest for the weights $\epsilon$ with the updates to the model parameters $\theta$, given current time step t, $$\tilde{\theta}^{t+1}(\epsilon^t) \leftarrow \theta^t - \eta \frac{\partial \sum_{i \in T}(w_{y_i} + \epsilon_i^t) L(f(x_i;\theta^t), y_i)}{\partial \theta}$$

$$\epsilon^{t+1} \leftarrow \epsilon^t - \tau \frac{\partial \sum_{i \in D} L\left(f\left(x_i; \tilde{\theta}^{t+1}(\epsilon^t)\right), y_i\right)}{\partial \epsilon}$$

$$\theta^{t+1} \leftarrow \theta^t - \eta \frac{\partial \sum_{i \in T}(w_{y_i} + \epsilon_i^{t+1}) L(f(x_i;\theta^t), y_i)}{\partial \theta}$$

The first equation tries a one-step gradient descent for $\theta^t$ using the losses weighted by the current conditional weights $\epsilon^t$ (plus the class-wise weights). The updated model parameters $\tilde{\theta}^{t+1}(\epsilon^t)$ are then scrutinized on the balanced development set D, which updates the conditional weights by one step. The updated weights $\epsilon^{t+1}$ are better than the old ones, meaning that the model parameters $\theta^{t+1}$ returned by the last equation should give rise to smaller recognition error on the development set than $\tilde{\theta}^{t+1}$ do. Starting from $\theta^{t+1}$ and $\epsilon^{t+1}$, the present invention then moves on to the next round of updates.

Figure 4:
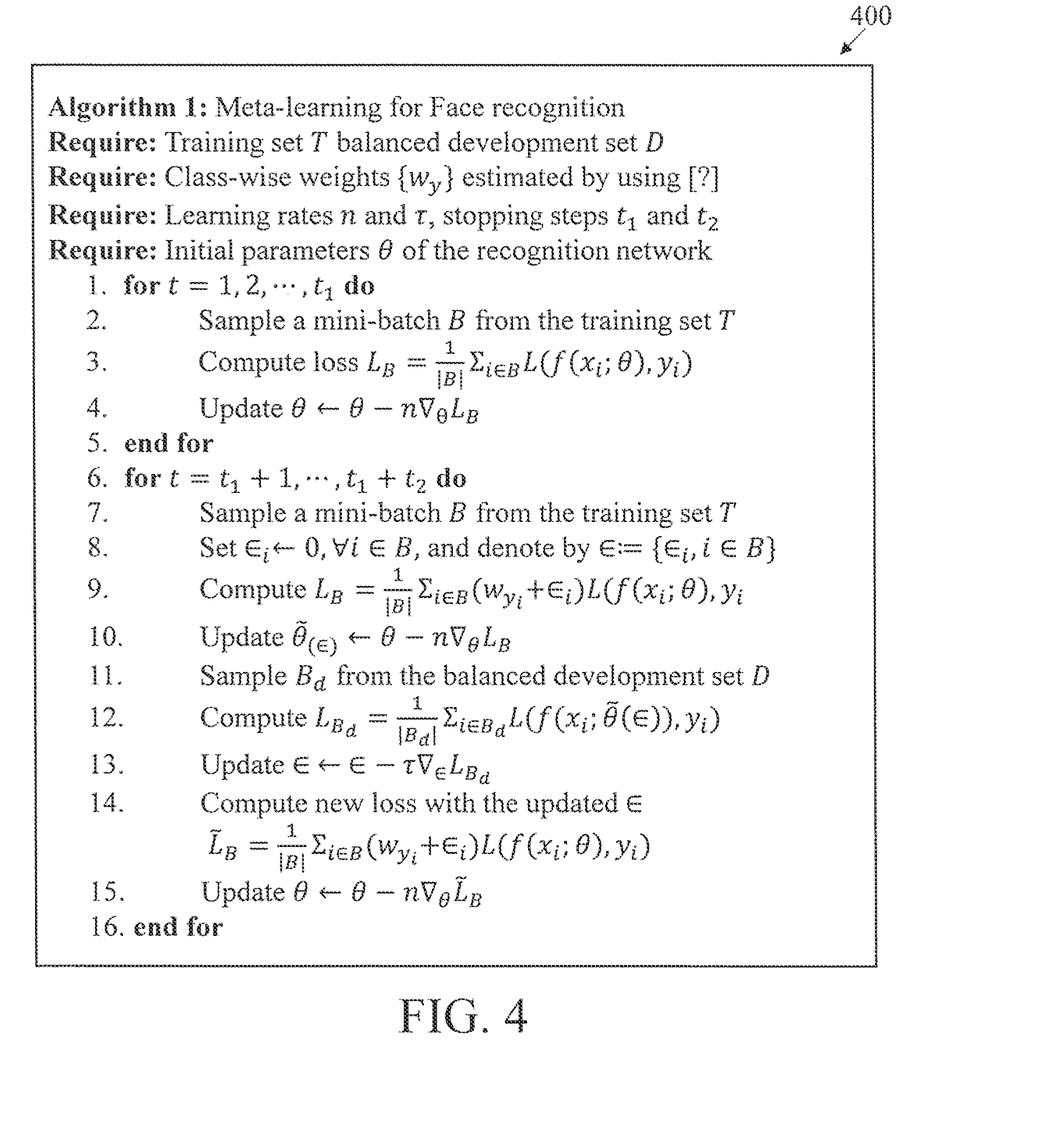
FIG. 4 is a diagram showing pseudocode 400 for meta-learning for face recognition, in accordance with an embodiment of the present invention.

FIG. 4 is a diagram showing exemplary pseudocode 400 for instance-level margin meta-learning, in accordance with an embodiment of the present invention.

A further description will now be given regarding an approach, in accordance with an embodiment of the present invention.

It is firstly shown that the cosine loss margin can be interpreted as the sampling importance, which has not been shown in the literature. In contrast to cosine loss which assures a pre-defined constant as the margin, the present invention proposes an instance-level variation-aware margin for each training sample to reflect its importance. Furthermore, the margin is decomposed into a prior constant and residual dynamic terms, which the latter represents multiple variation factors. Finally, the present invention introduces a meta-learning framework to adapt the residual term of the margin for each sample.

A description will now be given regarding an interpret margin as sampling importance, in accordance with an embodiment of the present invention.

Assume $\{(x_i, y_i)\}^N$ as the training set with $x_i$ and $y_i$ as the i-th input and corresponding label. Cosine loss with the constant margin $\overline{m}$ is defined for positive samples by Equation 1 Modeling the CNN backbone of the deep recognition model as $f(x; \Omega)$, with $\Omega$ as the network parameters, $\cos\theta_{i,y_i}$ is the inner product between feature vector $f(x_i; \Omega)$ and $y_i^{th}$ class template $$w_{y_i}^T \cos\theta_{i,y_i} = w_{y_i}^T f(x_i; \Omega).$$

Margin $\overline{m}$ is set as a positive constant to squeeze the inner product $$\cos\theta_{i,y_i}$$

to be larger than the margin. s is a scale factor to guarantee the training convergence.

$$L_{cos} = -\log \frac{e^{s\cos\theta_{i,y_i} - \overline{m}}}{e^{s\cos\theta_{i,y_i} - \overline{m}} + \sum_{k \neq y_i}^{C} e^{s \cdot \cos\theta_{i,k}}} \quad (14)$$

On the other hand, importance re-weighting methods generally introduced the importance weight $\sigma_{y_i}$ to re-weight each sample loss component according to sample long-tailed situation. Hence, the network training can be formulated as the minimization of proposed weighted loss function as follows:

$$\min_{\Omega} \frac{1}{N} \sum_{i=1}^{N} \sigma_{y_i} L_{cos}(f(x_i; \Omega), y_i), \quad (15)$$

where N is the number of classes. The class-wise weight $\sigma_{y_i}$ is generally designed to be proportional to the inverse of the number of samples per class. For example, a rule based method determines $\sigma_{y_i}$ as the "effective number" defined as $$\frac{1-\beta}{1-\beta^{n_{y_i}}},$$

where $n_{y_i}$ is the class volume. Combining Equation 14 with Equation 15, the following is obtained:

$$\min_{\Omega} \frac{1}{N} \sum_{i=1}^{N} -\log \frac{\left[e^{s\cos\theta_{i,y_i} - \overline{m}}\right]^{\sigma_{y_i}}}{\left[e^{s\cos\theta_{i,y_i} - \overline{m}} + \sum_{k \neq y_i}^{C} e^{s \cdot \cos\theta_{i,k}}\right]^{\sigma_{y_i}}} \quad (16)$$

Usually, for different classes $y_i$, the denominator part is generally similar, i.e. all close to $$[e^{s-\overline{m}} + C - 1]^{\sigma_{y_i}}.$$

The numerator is further converted into:

$$\left[e^{s\cos\theta_{i,y_i} - \overline{m}}\right]^{\theta_{y_i}} = e^{\sigma_{y_i} s\cos\theta_{i,y_i} - \sigma_{y_i}\overline{m}} \quad (17)$$
$$= e^{s'\cos\theta_{i,y_i} - m_i}$$

It has been found that the re-weighting loss Equation 16 is actually equivalent to a modified Cosine loss where $s' = \sigma_{y_i} s$ and $m_i = \sigma_{y_i}\overline{m}$ are defined as the new scaler and margin, respectively. The difference from Equation 14 is that, in the new formulation, the scaler and margin are both proportional to the class-aware weight $\sigma_{y_i}$. Therefore, the sampling importance learning problem can be translated as learning the per-class margin $m_i$ and scaler s' in the new Cosine loss framework. The present invention considers the fixed scalar $s = \sqrt{\log(C-1)}$ and mainly focuses on the margin from the aspect of importance sampling, which is not well investigated in the literature. Given the above discussion, class-aware margin $m_i$ reflects the sampling importance of class $y_i$. Here, instead of using a rule based method to assign $m_i$ values, the present invention exploits a meta-learning based method to adaptively learn the optimal importance does not sufficiently capture the variation of the instances, i.e., two face images from the same identity could show different importance as one may be taken under normal condition while the other could be taken with large head pose or under severe lighting condition.

A description will now be given regarding multi-variation cosine margin, in accordance with an embodiment of the present invention.

CosFace and other cosine distance based methods assume a constant margin shared all cross the dataset, which is equivalent to assign equal sampling importance for all training data. As mentioned herein, sampling importance at the instance level provides better variations capturing and it reflects these variations in the identification loss which can help compensating the training data bias.

To this end, the present invention proposes an instance-level variation-aware margin $m_{y_i,j}$ to assign an importance weight to each sample. Different factors can cause long-tailed distribution in training data and considering each if these factors would lead to a different set of instance-level margin. The present invention aims to combine a set of enumerable factors, such as ethnicity, head pose, image blur level and occlusion level, to provide an integrated single margin, called multi-variation cosine margin, which represents all aforementioned variation factors. Formally, the present invention leverages an additive model by combining the rule based margin as the prior $m_{y_i}^{cls}$ and a residual dynamic term which represents each variation's importance:

$$m_{y_i,j} = m_{y_i}^{cls} + \Sigma_k \lambda_k r_{y_i,j}^k, k \in \{eth, pose, occ., blur\}, \quad (18)$$

where $m_{y_i}^{cls}$ is the class-level margin prior calculated for class $y_i$. j stands for the instance-level index.

$$m_{y_i}^{cls} = \frac{\alpha}{n_{y_i}^{1/4}}, \quad (19)$$

$\alpha$ is a hyperparameter and $n_{y_i}$ is class $y_i$ sample volume. Intuitively, head class samples (large $n_y$) receive small margin while tail class samples (small $n_y$) receive large margin.

In Equation 15, k is the index enumerating the present inventions defined variations including eth for ethnicity, pose for head pose variation, occ. for occlusion ratio over the entire image and blur for image blur level, which the present invention uses synthesized occlusion and Gaussian blur for training. $\lambda_k$ is the combination factor regarding each variation, the inverse ratio of the number of long-tailed samples with respect to each variation. It is worth mentioning that $\Sigma_k \lambda_k = 1$ and these values are constant during the training. Finally, using the proposed instance level margin, the present invention defines ILVA loss function as follows:

$$L_{ILVA} = -\log \frac{e^{scos\theta_{i,y_i} - m_{y_i,j}}}{e^{scos\theta_{i,y_i} - m_{y_i,j}} + \sum_{k \neq y_i}^{C} e^{s \cdot cos\theta_{i,k}}} \quad (20)$$

A description will now be given regarding variation-aware residual meta-learning, in accordance with an embodiment of the present invention.

A description will now be given regarding variation-aware residual meta-learning, in accordance with an embodiment of the present invention.

To obtain the residual term of the importance weight, the present invention leverages a meta-learning framework, which utilizes a pre-defined validation set V as the input. The validation set does not share any identity with the original training set. The main idea is by checking each sample's variation in a training batch, it is expected the meta-learning to dynamically update the importance weight for each sample, such that the insufficiency of each variation (i.e., ethnicity, head pose, etc.) from this specific sample can be highlighted. By feedback such highlighted residual to form the adaptive cosine loss margin, the proposed ILVA loss updates the feature learning in an alternative way.

A description will now be given regarding a multi-branch baseline, in accordance with an embodiment of the present invention.

As introduced herein, the present invention models the margin as an additive formulation including a prior constant term, predetermined based on class volume imbalance, and the residual term $r = \Sigma_k r_{y_i,j}^k$ in Equation 15. The present invention considers the identification task denoted by $g(\bullet; u)$ as the main task and applies the proposed ILVA loss to update the recognition backbone. In addition, each variation corresponds to a residual term in the formulation. To model all margins related to these variations, the present invention sets up a multi-branch based framework. Specifically, for each of the enumerated factors of variation, ethnicity, head pose, blur and occlusion, the present invention sets up a classifier $g(\bullet; v_k)$. For example, the present invention sets up the ethnicity classifier with four classes to predict the ethnicity labels $y_i^k$ defined as Caucasian, African American, East Asian and South Asian.

In contrast to classical multi-task learning, the variation tasks do not contribute to the learning of the shared backbone $f(\bullet; \Omega)$ and they are only used to update the parameters in classifiers $g(\bullet; v_k)$. The variation classifiers are implemented to provide loss feedback to the meta-learning module update. The reason variation classifiers are not used to update the identity feature is that, the variations actually encourage the identify feature for id irrelevant tasks, which leads to id-variant feature, The training is similar to the adversarial learning: the main task uses ILVA to learn id feature which is invariant to other variations, while the variation tasks learn the classifier, and use the meta-learning with a validation set to rectify the instance-level margin in the ILVA loss to highlight the tailed samples.

The objective to train the variation classifiers is the cross entropy loss:

$$L_{var}^k(x, y^k; v_k) = \Sigma_j L_{ce}(g(f(x_j;\Omega); v_k) y_j^k), \quad (21)$$

where $L_{var}^k$ is cross-entropy loss for variation task k and $y_j^k$ is the label for sample j under variation task k.

A description will now be given regarding multi-variation meta learning, in accordance with an embodiment of the present invention.

It is realized that the baseline do not change the importance weight. To find out the distribution imbalance along each of the variation, the present invention uses the trained classifiers $v_k$ predicted logits to indicate the score. It is believed that samples that are close in variation distribution brings the similar classifier logits.

A description will now be given regarding hard validation sample mining, in accordance with an embodiment of the present invention.

To effectively feedback the tailed distribution information based on one training batch, the present invention conducts a hard sample mining to search for the most distinctive samples from a pre-defined validation set V, which has no identity overlap with the training set.

$$\{x_j\}: \underset{x_j \in V}{\operatorname{argmax}} \|v_k(x_j) - v_k(x_b)\|_2, x_b \in B, \quad (22)$$

where $x_b$ is a sample from the current training batch B. $v_k(.)$ represents predicted logits by kth variation classifier. In the next step, selected samples by the proposed hard mining technique are utilized to train the meta-learning module.

Next, required steps are explained to perform one iteration of the proposed meta learning framework. For the sake of simplicity, the class index i is omitted from the formulations and only the sample index j is kept.

A description will now be given regarding the pseudo model update, in accordance with an embodiment of the present invention.

At each iteration t, the present invention uniformly samples a batch T from the training data and feeds it into the recognition model to update the model parameters $\Omega$. Notice that the model $\Omega$ update can be rolled back to previous iteration t−1 if the current model $\Omega$ does not achieve better performance.

$$\Omega_t: \underset{\Omega}{\operatorname{argmax}} \sum_{j \in T} L_{ILVA}(f(x_j; \Omega, m_{j,t}), y_j) \quad (23)$$

A description will now be given regarding a meta-update on margin residual, in accordance with an embodiment of the present invention.

The present invention exploits the online hard sample mining method described by Equation 22 to prepare the validation batch from validation set V. Then using the model parameter $\Omega_t$ updated in the previous step, the present invention leverages the multi-branch variation classification loss to update margin residue terms:

$$r_{j,t+1} : \underset{m_{j,t}}{\mathrm{argmax}} \sum\nolimits_{k,j \in V} L_{var}^k(f(x_j; \Omega_t, m_{j,t}), v_k, y_j^k)). \qquad (24)$$

With $r_{j,t+1}$, margin $m_{j,t+1}$ is obtained via Equation 15. The updated margin $m_{j,t+1}$ would be better than the previous update $m_1$ in the sense that it results in smaller classification errors in variation tasks by balancing multiple variation factors.

A description will now be given regarding a real model update, in accordance with an embodiment of the present invention.

The present invention applies the obtained new importance margin $m_{j,t+1}$ to conduct the real recognition model update:

$$\Omega_{t+1} : \underset{\Omega}{\mathrm{argmax}} \sum\nolimits_{j \in T} L_{ILVA}(f(x_j; \Omega, m_{j,t+1}), y_j)$$

Figure 5:
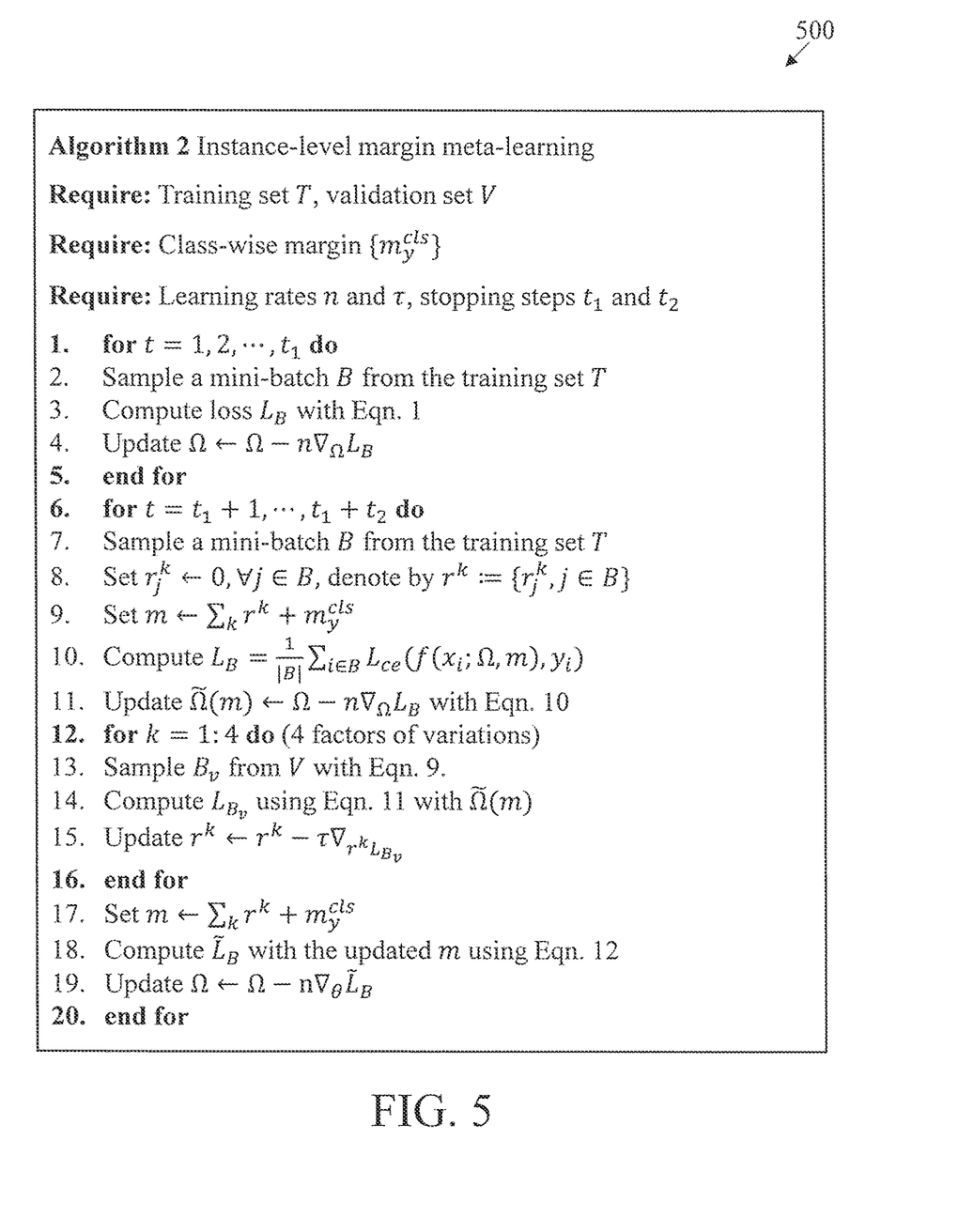
FIG. 5 is a diagram showing pseudocode 500 for sample-level margin meta-learning, in accordance with an embodiment of the present invention.

The overall algorithm is summarized in Algorithm 2 in FIG. 5. The present invention pursues the optimal margin $m_j$ that minimizes the loss in Equation 24 while performing optimally for the face recognition model $f(\bullet; \Omega)$ update. The present invention considers multiple branches for $r_j^k$ to estimate the residual where one single domain weight itself would lead to estimate bias.

Figure 6:
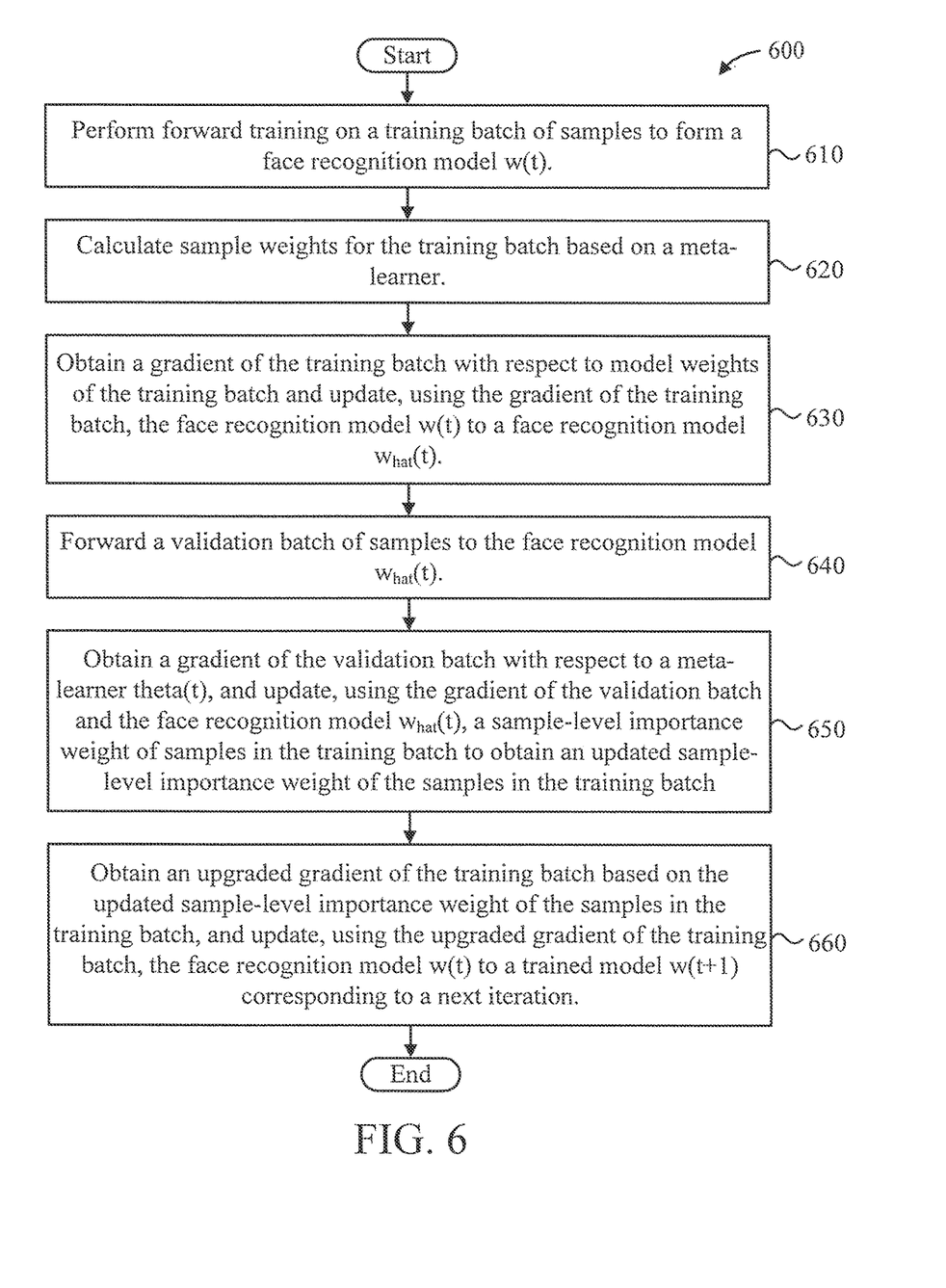
FIG. 6 is a flow diagram showing an exemplary method 600 for sample-level margin meta-learning, in accordance with an embodiment of the present invention.

FIG. 6 is a flow diagram showing an exemplary method for sample-level margin meta-learning, in accordance with an embodiment of the present invention.

At block 610, perform forward training on a training batch of samples to form a face recognition model w(t).

At block 620, calculate sample weights for the training batch based on a meta-learner.

At block 630, obtain a gradient of the training batch with respect to model weights of the training batch and update, using the gradient of the training batch, the face recognition model w(t) to a face recognition model $w_{hat}(t)$.

At block 640, forward a validation batch of samples to the face recognition model $w_{hat}(t)$.

At block 650, obtain a gradient of the validation batch with respect to a meta-learner theta(t), and update, using the gradient of the validation batch and the face recognition model $w_{hat}(t)$, a sample-level importance weight of samples in the training batch to obtain an updated sample-level importance weight of the samples in the training batch.

At block 660, obtain an upgraded gradient of the training batch based on the updated sample-level importance weight of the samples in the training batch, and update, using the upgraded gradient of the training batch, the face recognition model w(t) to a trained model w(t+1) corresponding to a next iteration.

The significance of corresponding to the next iteration: The meta-learning based model w(t) update is critical as it leverages the complementary information from the validation set, automatically discovering the distribution imbalance based on the feedback of the domain (variation) classifier, to mitigate the face recognition training imbalance. As the training is iterative, each stage the training model is based on the previous training model update. The updated training model w(t+1) is the starting point of the next iteration.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for training a model for deep face recognition, comprising:

performing forward training on a training batch of samples to form a face recognition model $w(t)$;

calculating sample weights for the training batch based on a meta-learner;

obtaining, by a processor device, a gradient of the training batch with respect to model weights of the training batch and updating, using the gradient of the training batch, the face recognition model $w(t)$ to a face recognition model $w_{hat}(t)$;

forwarding a validation batch of samples to the face recognition model $w_{hat}(t)$;

obtaining, by the processor device, a gradient of the validation batch with respect to a meta-learner theta(t), and updating, using the gradient of the validation batch and the face recognition model $w_{hat}(t)$, a sample-level importance weight of samples in the training batch to obtain an updated sample-level importance weight of the samples in the training batch; and obtaining, by the processor device, an upgraded gradient of the training batch based on the updated sample-level importance weight of the samples in the training batch, and updating, using the upgraded gradient of the training batch, the face recognition model w(t) to a trained model w(t+1) corresponding to a next iteration.

2. The computer-implemented method of claim 1, wherein a weight for each of the samples in the training batch used for model training comprises a class-level weight and the upgraded sample-level importance weight.

3. The computer-implemented method of claim 2, wherein the updated sample-level importance weight of the samples in the training batch are proportional to class-aware weights for the samples in the training batch.

4. The computer-implemented method of claim 1, wherein the validation set lacks sharing identities with the training set.

5. The computer-implemented method of claim 1, wherein the training set comprises variations including ethnicity variations, pose variations, occlusion ratios over entire images, and image blur levels.

6. The computer-implemented method of claim 1, further comprising checking a sample variation of each of a plurality of samples in the training batch to dynamically update the sample-level importance weight for each of the plurality of samples such that any variation insufficiency is highlighted.

7. The computer-implemented method of claim 6, wherein the variation insufficiently is selected from the group consisting of ethnicity variations, pose variations, occlusion ratios over entire images, and image blur levels.

8. The computer-implemented method of claim 1, wherein the updated sample-level importance weight of the samples in the training batch is non-constant across the samples in the training batch.

9. The computer-implemented method of claim 1, further comprising performing, using the trained model w(t+1), a face recognition session to generate an identity of an individual.

10. A computer program product for training a model for deep face recognition, the computer program product comprising a non-transitory computer readable storage medium having program instructions embodied therewith, the program instructions executable by a computer to cause the computer to perform a method comprising:
   performing, by a processor device of the computer, forward training on a training batch of samples to form a face recognition model w(t);
   calculating, by the processor device, sample weights for the training batch based on a meta-learner;
   obtaining, by the processor device, a gradient of the training batch with respect to model weights of the training batch and updating, using the gradient of the training batch, the face recognition model w(t) to a face recognition model $w_{hat}(t)$;
   forwarding, by the processor device, a validation batch of samples to the face recognition model $w_{hat}(t)$;
   obtaining, by the processor device, a gradient of the validation batch with respect to a meta-learner theta(t), and updating, using the gradient of the validation batch and the face recognition model $w_{hat}(t)$, a sample-level importance weight of samples in the training batch to obtain an updated sample-level importance weight of the samples in the training batch; and
   obtaining, by the processor device, an upgraded gradient of the training batch based on the updated sample-level importance weight of the samples in the training batch, and updating, using the upgraded gradient of the training batch, the face recognition model w(t) to a trained model w(t+1) corresponding to a next iteration.

11. The computer program product of claim 10, wherein a weight for each of the samples in the training batch used for model training comprises a class-level weight and the upgraded sample-level importance weight.

12. The computer program product of claim 11, wherein the updated sample-level importance weight of the samples in the training batch are proportional to class-aware weights for the samples in the training batch.

13. The computer program product of claim 10, wherein the validation set lacks sharing identities with the training set.

14. The computer program product of claim 10, wherein the training set comprises variations including ethnicity variations, pose variations, occlusion ratios over entire images, and image blur levels.

15. The computer program product of claim 10, further comprising checking a sample variation of each of a plurality of samples in the training batch to dynamically update the sample-level importance weight for each of the plurality of samples such that any variation insufficiency is highlighted.

16. The computer program product of claim 15, wherein the variation insufficiently is selected from the group consisting of ethnicity variations, pose variations, occlusion ratios over entire images, and image blur levels.

17. The computer program product of claim 10, wherein the updated sample-level importance weight of the samples in the training batch is non-constant across the samples in the training batch.

18. The computer program product of claim 10, further comprising performing, using the trained model w(t+1), a face recognition session to generate an identity of an individual.

19. A computer processing system for training a model for deep face recognition, comprising:
   a memory device for storing program code; and
   a processor device operatively coupled to the memory device for running the program code to:
      perform forward training on a training batch of samples to form a face recognition model w(t);
      calculate sample weights for the training batch based on a meta-learner;
      obtain a gradient of the training batch with respect to model weights of the training batch and updating, using the gradient of the training batch, the face recognition model w(t) to a face recognition model $w_{hat}(t)$;
      forwarding a validation batch of samples to the face recognition model $w_{hat}(t)$;
      obtain a gradient of the validation batch with respect to a meta-learner theta(t), and updating, using the gradient of the validation batch and the face recognition model $w_{hat}(t)$, a sample-level importance weight of samples in the training batch to obtain an updated sample-level importance weight of the samples in the training batch; and
      obtain an upgraded gradient of the training batch based on the updated sample-level importance weight of the samples in the training batch, and updating, using the upgraded gradient of the training batch, the face recognition model w(t) to a trained model w(t+1) corresponding to a next iteration.

20. The computer processing system of claim 19, wherein a weight for each of the samples in the training batch used for model training comprises a class-level weight and the upgraded sample-level importance weight.

* * * * *